UNITED STATES PATENT OFFICE.

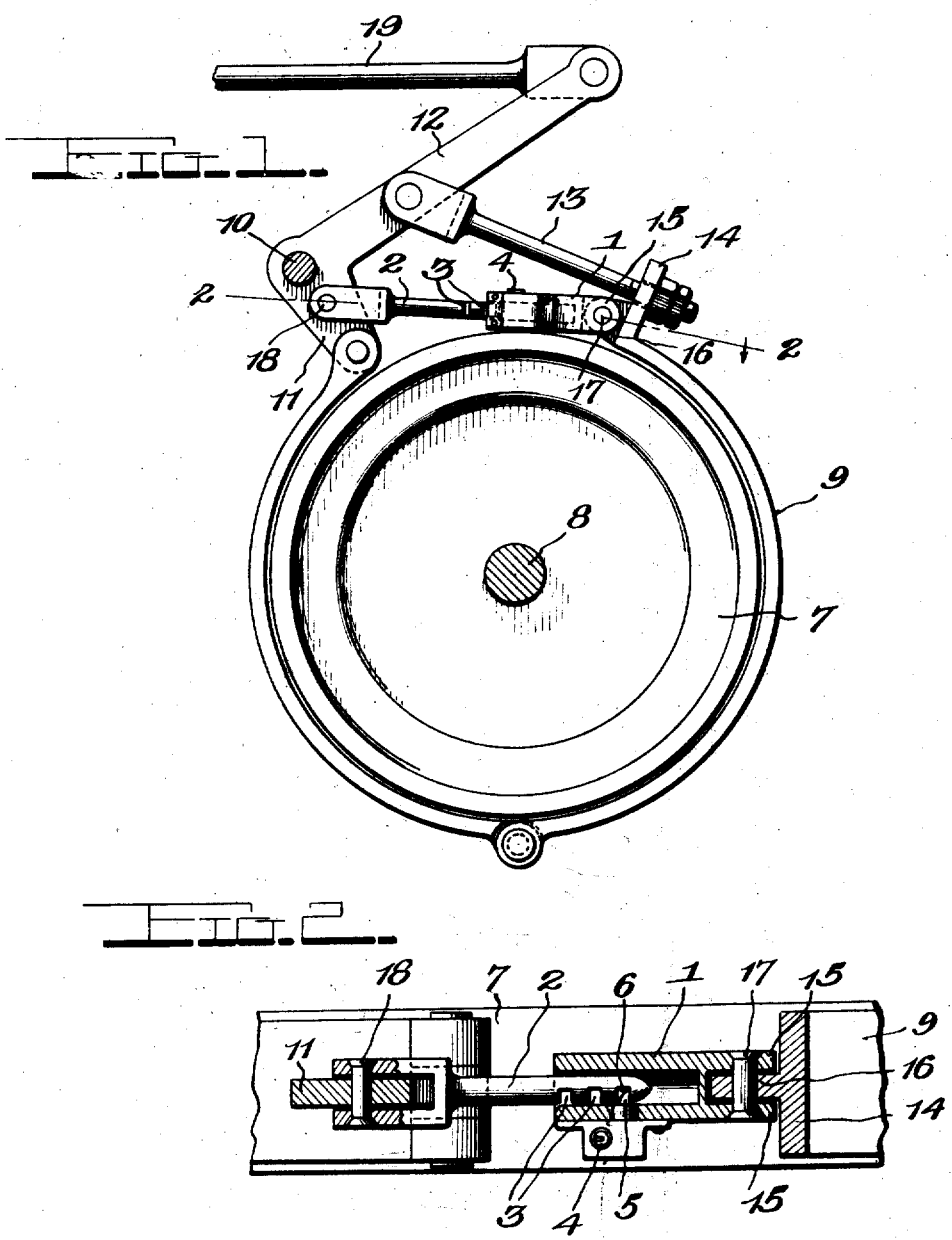

FOREST W. BOYD, OF PROVIDENCE, RHODE ISLAND.

AUTOMOBILE-LOCK.

1,257,453.     Specification of Letters Patent.     Patented Feb. 26, 1918.

Application filed June 16, 1917. Serial No. 175,103.

*To all whom it may concern:*

Be it known that I, FOREST W. BOYD, a citizen of the United States, residing at Providence, in the county of Providence and State of Rhode Island, have invented a new and useful Improvement in Automobile-Locks, of which the following is a specification.

This invention relates to certain new and useful improvements in an automobile lock and especially to an improved lock for securely holding the brakes of an automobile or other vehicle, applied or operative.

The invention consists in a lock to be applied to the brake bands of vehicles, the keeper part being mounted on one end of the band and the locking bolt carried by the opposite end of said band for entering the keeper part when the brake is applied where it is securely locked against releasement of the band should the usual brake-operating pedal or lever be released.

Further, the invention resides in the features of construction and arrangements and combinations of parts hereinafter described and claimed, reference being had to the accompanying drawing wherein Figure 1 is an elevation of a brake drum and the encircling band, of a well known type of automobile brake, showing the present invention in its inoperative position, and Fig. 2 is a horizontal section on line—2—2 of Fig. 1, the lock of the keeper being left in elevation, and the improved device disclosed in its operative position.

More particularly, the invention consists of a tubular or otherwise form of keeper 1 and a locking bolt 2 which is received in the socketed or opened end of the keeper and provided in its free or received end with a series of openings or notches 3. A suitable lock 4 is carried by the keeper in a casing formed or secured thereon, the bolt 5 of said lock 4 entering the chamber of the keeper through the side wall thereof for engaging in one of the series of openings 3. If desired, the outer face of bolt 5 may be beveled, as at 6, and the forward end of the locking bolt 2 tapered to permit of the latter riding past the bolt 5 as the brake band is tightened or the ordinary square bolt may be used in which case the lock is operated by a key after the brake has been set up.

The invention may be applied to many types of band brakes so it is not intended to limit its application to only that type illustrated in which 7 indicates the drum that is usually carried on the rear axle 8 and is encircled by the two-part brake band 9. The band tightening lever is of bell-crank design and has pivotal mounting at 10, the shorter arm 11 being pivotally connected in a direct manner to one end of the band while the longer arm 12 is connected through an adjusting link 13 with the upstanding wall 14 which constitutes the opposite terminal of said band.

The improved lock has its keeper part carried by one end of the brake band and its locking bolt mounted on the opposite end of the same. Suitable means for mounting the parts may be employed although a pivotal mounting of the parts is here disclosed, the same consisting in providing rearwardly extending ears 15 of the keeper part for receiving therebetween a forwardly extending ear 16, on the upstanding end wall 14, said ears being pivotally joined through the intermediary of pin 17. The locking bolt is indirectly connected to the opposite end of the brake band through the instrumentality of the shorter arm 11 of the band-tightening lever to which it is pivotally connected by pin 18.

In operation, under ordinary or running conditions the bolt of the lock is retracted, that is to say withdrawn from the openings 3. When in use the bolt is released by a key and as the band is tightened by pulling on rod 19, the ends of said band are drawn into closer relation with the resultant telescopic action of the locking bolt in the keeper. The openings or notches 3 are arranged so as to readily be engaged by the bolt 5 so that, when the brake has been applied, the band will be retained in close embrace with its drum by the band lock. To release the brake, the operator inserts a key into the locker and actuates the same to withdraw the bolt 5 from its engaged notch.

The lock is especially efficient in attempts at theft, as the bands are securely held in tight embrace about their drums. The improved device is disposed in an obscure and out-of-the-way place and may be applied to the regular brake band without appreciable added cost.

Having thus described my invention, what I claim as new and desire to secure by Letters Patent is—

1. In an automobile lock, a drum, an encircling two-part band having opposing terminals one of which is provided with an upstanding end wall having a forwardly extending ear, a bell-crank lever having one arm connected to the other terminal, means connecting the opposite terminal to the other arm of the lever, a tubular keeper part having rearwardly extending ears receiving the first ear and pivotally connected thereto, a locking bolt pivotally connected to the first arm of the lever and having its free end receivable by the keeper part and provided with a series of openings, and a lock carried by the keeper part and provided with a bolt projecting into the chamber of the keeper part for engaging in the series of openings of the locking bolt for holding the band in its operative position.

2. A lock for automobiles having a brake drum, an encircling band, and means for tightening the band about the drum, said lock comprising a keeper part carried by one end of the band, and a locking bolt connected to the opposite end of said band for engagement with the keeper part when the band is tightened for holding the latter operative.

3. A lock for vehicles having a drum, an encircling brake band therefor, and means for applying the band, said lock comprising a socketed keeper part carried by one end of the band, a locking bolt connected to the opposite end of the band for engaging in and being guided by the keeper when the band is tightened, and means carried by the keeper for holding the bolt therein to retain the brake band operative.

4. In combination with a brake band and its connected and operating bell-crank lever, of a lock for holding the band operative against actuation by the lever, said lock comprising a lock bolt and a keeper therefor, one lock part carried by one end of the band and the coöperating lock part carried by the bell-crank lever for being moved thereby to an operative position when said lever is operated to apply the brake.

5. In an automobile lock, a drum, an encircling brake band having opposing terminals, a bell-crank lever having one arm connected to one terminal, means connecting the opposite terminal to the other arm of the lever, a tubular keeper part pivotally connected to the latter terminal, a locking bolt pivotally connected to the first arm of the lever and having its free end receivable by the keeper part and provided with a series of openings, and a lock carried by the keeper part and provided with a bolt projecting into the chamber of the keeper part for engaging in the series of openings of the locking bolt for holding the band in its operative position.

In testimony whereof I have signed my name to this specification in the presence of two subscribing witnesses.

FOREST W. BOYD.

Witnesses:
 ADA E. HAGERTY,
 J. A. MILLER.